(No Model.)
J. E. BUXTON.
AUTOMATIC GRAIN MEASURER.
No. 497,424. Patented May 16, 1893.
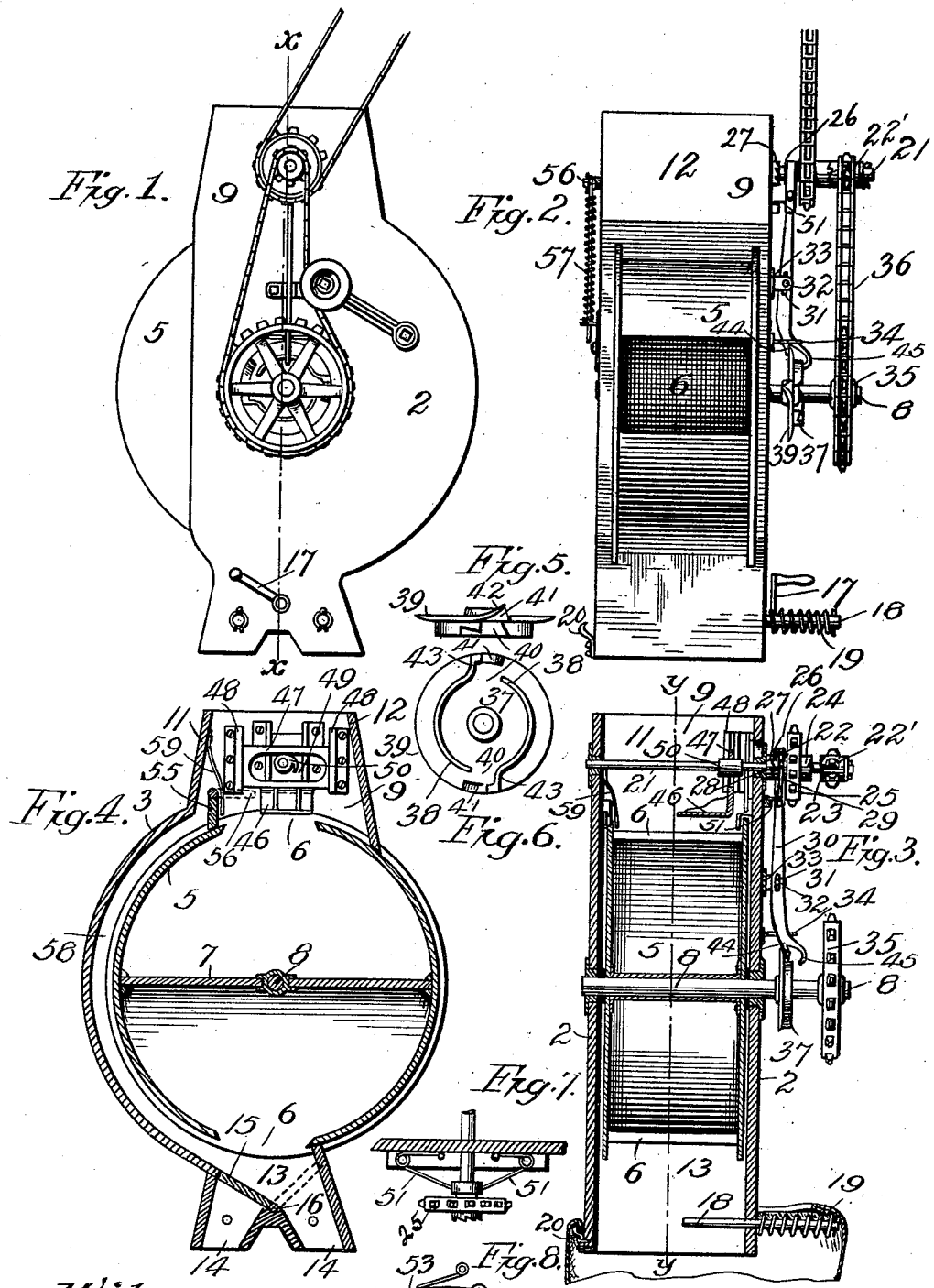
Witnesses,
O. E. Van Doren,
G. Hawley
Inventor,
John E. Buxton.
By Paul & Merwin
his Attorneys.

UNITED STATES PATENT OFFICE.

JOHN E. BUXTON, OF OWATONNA, MINNESOTA.

AUTOMATIC GRAIN-MEASURER.

SPECIFICATION forming part of Letters Patent No. 497,424, dated May 16, 1893.

Application filed May 21, 1892. Serial No. 433,794. (No model.)

*To all whom it may concern:*

Be it known that I, JOHN E. BUXTON, of Owatonna, in the county of Steele and State of Minnesota, have invented a certain Improved Grain-Bagger, of which the following is a specification.

My invention relates to improvements in means for measuring and bagging grain and especially to improvements in that class of machines having a revoluble two-part measuring drum and the object of the invention is to provide a device which may be operated continuously and successfully used in accurately measuring grain flowing either intermittently or continuously into the hopper of the device.

To this end my invention consists in the combination with a revoluble two-part drum provided with openings through which the grain is alternately admitted and discharged, of a vertically reciprocating packer arranged above said drum and in the hopper covering the top thereof, a shaft whereon a cam is arranged to operate said packer, said shaft being vertically movable and provided with fixed and loose clutch parts, a longitudinally movable power wheel arranged to revolve upon said shaft and having parts to engage said clutch parts, means for operating the drum shaft and drum from the loose clutch part when said power wheel is thrown into engagement therewith, and a double stop cam provided on the drum shaft in connection with a forked lever to engage the same, said lever being pivoted on the frame of the machine and having its upper end connected with said loose wheel or pulley.

The invention will be more readily understood by reference to the accompanying drawings, forming a part of this specification, and in which—

Figure 1 is a side elevation of a machine embodying my invention. Fig. 2 is an end or longitudinal elevation thereof. Fig. 3 is a longitudinal vertical section on the line $x-x$ of Fig. 1. Fig. 4 is a transverse vertical section on the line $y-y$ of Fig. 3. Figs. 5 and 6 are respectively plan and face views of the double cam which I arrange upon the drum shaft. Fig. 7 is a detail view showing the springs for forcing out the loose pulley upon the packer-shaft. Fig. 8 is a detail view showing the lock of the drum.

As shown in the drawings, 2, 2 represent the sides of the machine having semicircular extensions upon which I arrange the side casings 3.

5 represents the drum which has in its opposite sides the two openings 6 and is divided in its middle by the partition 7 the drum being firmly secured on the shaft 8 which has bearings in the walls 2. Above the drum I provide the hopper 9 formed by the side walls 2 and the uprights 11 and 12, the latter of which extends down close to the outer surface of the drum. Beneath the drum I arrange a discharge hopper or space 13 from which extend the two spouts 14, the grain being directed into one or the other by the position of the gate 15 arranged on the shaft 16 which on the outside of the casing is provided with the crank 17 for operating the gate by hand. Through each spout extends a spindle 18 having a coiled spring 19 extending to force it outward and on the opposite side of the machine I provide small hooks 20 upon which the bag is fastened, the other side of the bag being stretched out and held by one or the other or by both of the spring spindles 18. By using two spouts 14 I am enabled to carry on the bagging continuously, the first bag being placed while another is being filled.

Extending longitudinally through the upper hopper 9 is the shaft 21 arranged in the slotted bearings 22 adapting the shaft to be moved vertically. On the outer end of the shaft I provide the loosely running sprocket pinion 22' having the clutch part 23 with which the counterpart 24 on the loose sprocket wheel 25 is adapted to engage at times. The opposite end of the hub of this wheel has a similar clutch part 26 and I arrange the fixed clutch part 27 on the shaft and close to the outer wall 2. This end of the hub has a groove 28 in which the pins of the yoke 29 are confined. This yoke is formed on the upper end of the depending lever 30 having the slot 31 through which the fulcrum pin 32 extends, said pin being fastened upon the wall 2 by the projecting lug 33. The lower end of the lever is guided in the slot of the lug 34 projecting from the wall 2.

On the projecting ends of the shaft 8 I arrange the large sprocket wheel 35 in line with the small wheel 22' connecting the same by the link belt 36. Upon this shaft I also provide the double cam wheel 37 having the outwardly projecting annular flange 38, and the vertical flange 39. In the first I provide the two notches 40 and in the second the notches 41 opposite the same and having the backwardly flared or inclined lugs 42. The vertical lugs 43 are arranged to engage the inner finger 44 arranged on the lower end of the lever after the same has been forced out by engagement with the outwardly inclined lug 42. When the end of the lever is in the inner position the hooked end 45 of the lever is adapted to operate within the flange 38 and to prevent the lever and the shaft 21 from being lifted too far.

Within the hopper 9 I arrange the packer 46 formed upon the plate 47 having its edges confined in the vertical guides 48 and provided with the transverse slot 49 within which a small cam 50 on the shaft 21 is adapted to operate to alternately raise and lower the packer and when the packer is upheld by grain piling beneath it the cam acts upon the lower edge of the slot 49 to lift the shaft 21 and therewith the lever 30 which being withdrawn from engagement with the cam wheel permits the loose pulley 25 to be forced outwardly by the springs 51 thereby throwing the same into engagement with the pulley 22' and through the same operating the measuring drum which is moved through a half-revolution to carry its opening 6 into line with the discharge hopper. At the instant the hopper arrives at this position it is held by the spring pawl 53 arranged to slip into the notch 54 (see Fig. 8) in the edge of the drum, one of these notches being provided opposite each hole 6, the drum being prevented from moving back thereby. At this instant also one of the inclined lugs 42 of the cam arrives opposite the finger 44 and instantly forces out the lower end of the lever and thereby forcing the loose pulley into engagement with the fixed clutch part of the shaft 21 at the instant stopping the drum and setting the packer in operation.

In the side of the hopper opposite the wall 12 I provide the vertical gate or cut off 55, the shaft of which extends out on the rear side of the machine and is provided with an arm 56 against which the tension of the spring 57 is constantly exerted to hold the lower edge of the gate firmly upon the top of the drum. The tension of this spring may be adjusted so that the gate will permit a small layer of grain to pass beneath it and by its proper adjustment a greater or less quantity of grain may be permitted to fall into the passage 58 and thence into the hopper 13 thereby making up any deficiency in the measure of grain contained in the upper side of the drum. I preferably provide in the hopper 9 a number of flexible hangings 59 lapping over the joints between the hopper walls and the drum to compel the passage of all the grain into the drum.

Having thus described my invention, I claim as new and desire to secure by Letters Patent—

1. The combination with a revoluble measuring device, of a receiving hopper arranged above the same, a vertically movable shaft provided therein, a packer arranged to be operated therefrom, a driving wheel or pulley loosely journaled on said shaft and slidable thereon, a fixed clutch part on said shaft to be engaged by said pulley to operate said packer, and a loose clutch part thereon with which said wheel is adapted to engage the same being connected with the revoluble measuring device.

2. The combination with a revoluble two part measuring device, of the shaft whereon the same is secured, a cam arranged thereon and provided with the notched horizontal and vertical flanges, and with the cam parts 42, the hopper arranged above the measuring device, the shaft extending therethrough and vertically movable, a cam provided on said shaft, a slotted packer device arranged to be vertically reciprocated by said cam, a fixed clutch part on said shaft, a loose longitudinally movable driving wheel thereon to engage said clutch part, a depending lever having its upper end connected with said wheel and its lower end forked and adapted to engage the cam wheel on the first mentioned shaft, a second clutch part loosely journaled on the packer shaft, a larger wheel provided upon the other shaft, and a belt extending between the same, substantially as and for the purpose specified.

3. The combination with the cylindrical drum having the partition 7 and the openings 6, with the shaft 8, the supporting walls 2 whereon said shaft is journaled, the hopper 9, vertical guides arranged upon the said wall 2, the packer 46 having the slotted portion 47 and adapted to move in said guides, the packer shaft extending through said hopper and provided with the cam to operate the same, said shaft being vertically movable, the fixed clutch part provided on the outer end thereof, and the loose clutch part, the loose driving wheel adapted to engage one or the other of said clutch parts, the wheel 35 on the shaft 8, the belt extending therefrom to said loose clutch part, a depending lever having its upper end in engagement with the hub of said driving wheel and being vertically movable, and the double stop cam arranged to be engaged by the lower end of said lever, all substantially as and for the purpose specified.

4. The combination with the two part revoluble measuring drum having the openings 6 in its opposite sides, with the shaft 8 the receiving hopper 9 arranged above the drum and having its walls bearing closely upon the same, a vertically reciprocating packer provided in said hopper, the packer shaft provided with a cam for operating the said packer, said shaft being vertically movable, a driving wheel journaled on the outer end thereof, a loose driving wheel to be engaged thereby and arranged to operate the shaft 8 and the drum, the double stop cam 37 arranged on said shaft 8, a spring to force said driving wheel outwardly on said shaft, and means arranged in connection therewith and with said cam 37 whereby as the packer shaft is raised by the obstruction of the packer said cam is freed and said driving wheel thrown into engagement with said loose part to operate the shaft 8, substantially as described.

5. The combination with the cylindrical drum provided with the partition 7 and the openings 6, of the walls 2, the side duct 58, the hopper 9 and the hopper 13 arranged above and beneath the drum respectively, the cut off gate 55 provided in the hopper 9 and closing the passage into the duct 58, a spring in connection with said gate, means for regulating the tension thereof, a reciprocating packer provided in the hopper 9, and means for alternately operating the same and the drum, substantially as described.

6. The combination with the revoluble two part drum, of the shaft 8, the supporting and inclosing walls, and the hopper 9, the reciprocating packer provided with the slot 49 and arranged to operate in vertical guides, the vertically movable packer shaft having the cam 50 to operate in the slot of the packer, the fixed clutch part 22 on said shaft, the longitudinally movable driving wheel 25, the loose clutch part 22' the wheel 35 on the shaft 8, the sprocket belt 36 passing therefrom over the part 22', said driving wheel being adapted to engage said fixed and loose clutch parts alternately, the lever 30 provided with the slot wherein the pivot pin is contained, a guide for the lower end of said lever said lower end provided with the straight and curved fingers 44 and 45 respectively, and the wheel arranged on the shaft 8 and having the horizontal and vertical flanges provided with the notches 40 and 41 respectively, and the cam and stop parts 42 and 43 arranged to engage the finger 44 whereby the drum is held, substantially as described.

In testimony whereof I have hereunto set my hand this 12th day of May, 1892.

JOHN E. BUXTON.

In presence of—
C. G. HAWLEY,
F. S. LYON.